United States Patent
Picot et al.

(10) Patent No.: US 10,249,447 B2
(45) Date of Patent: Apr. 2, 2019

(54) PROCESS FOR MANUFACTURING AN ALKALINE-BASED HYBRID SUPERCAPACITOR TYPE BATTERY, BATTERY OBTAINED BY THIS PROCESS AND PROCESS FOR RECYCLING AN ANODE MATERIAL OF AN ALKALI-ION BATTERY

(71) Applicant: COMMISSARIAT A L'ENERGIE ATOMIQUE ET AUX ENERGIES ALTERNATIVES, Paris (FR)

(72) Inventors: Matthieu Picot, Grenoble (FR); Philippe Azais, Saint Egreve (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 133 days.

(21) Appl. No.: 15/027,988

(22) PCT Filed: Oct. 13, 2014

(86) PCT No.: PCT/IB2014/065267
§ 371 (c)(1),
(2) Date: Apr. 7, 2016

(87) PCT Pub. No.: WO2015/056152
PCT Pub. Date: Apr. 23, 2015

(65) Prior Publication Data
US 2016/0240324 A1    Aug. 18, 2016

(30) Foreign Application Priority Data
Oct. 14, 2013 (FR) .................... 13 59953

(51) Int. Cl.
*H01G 11/06* (2013.01)
*H01G 11/30* (2013.01)
(Continued)

(52) U.S. Cl.
CPC ............. *H01G 11/06* (2013.01); *H01G 11/30* (2013.01); *H01G 11/32* (2013.01); *H01G 11/50* (2013.01);
(Continued)

(58) Field of Classification Search
None
See application file for complete search history.

(56) References Cited

U.S. PATENT DOCUMENTS 5,427,873 A * 6/1995 Shuster .................. H01M 6/26
429/188
6,150,050 A   11/2000 Mathew et al.
(Continued)

FOREIGN PATENT DOCUMENTS

CN    101710632 A  *  5/2010
CN    101710632 B      5/2012
(Continued)

OTHER PUBLICATIONS

CN-103681005-A abstract, Li Li, (Year: 2018).*
(Continued)

*Primary Examiner* — David E Graybill
(74) *Attorney, Agent, or Firm* — Christensen O'Connor Johnson Kindness PLLC

(57) ABSTRACT

A process is provided for manufacturing an alkaline-based hybrid supercapacitor type battery, to an alkaline-based hybrid supercapacitor type battery, and to a process for recycling a negative electrode of an alkali-ion battery. The process for manufacturing the alkaline-based hybrid supercapacitor type battery comprises forming a negative electrode A from an electrode material B originating from a used alkali-ion battery having lost at least some of its initial capacity. Embodiments of the present disclosure are in particular applicable to the field of batteries.

10 Claims, 4 Drawing Sheets

USING NEGATIVE ELECTRODE B AS A NEGATIVE ELECTRODE A OF HYBRID SUPERCAPACITOR BASED ON AN ALKALI METAL    300

(51) Int. Cl.
*H01G 11/32* (2013.01)
*H01G 11/50* (2013.01)
*H01G 11/86* (2013.01)
*H01M 10/54* (2006.01)
*H01M 4/587* (2010.01)
*H01M 10/052* (2010.01)

(52) U.S. Cl.
CPC ............ *H01G 11/86* (2013.01); *H01M 4/587* (2013.01); *H01M 10/54* (2013.01); *H01M 10/052* (2013.01); *Y02E 60/13* (2013.01); *Y02W 30/84* (2015.05)

(56) References Cited

U.S. PATENT DOCUMENTS

| | | | |
|---|---|---|---|
| 6,511,639 B1 | 1/2003 | Schmidt et al. | |
| 7,582,380 B1* | 9/2009 | Dunstan | H01M 10/0525 |
| | | | 429/188 |
| 8,846,225 B2* | 9/2014 | Sloop | H01M 10/052 |
| | | | 117/2 |
| 9,287,552 B2* | 3/2016 | Sloop | H01M 10/052 |
| 9,484,606 B1* | 11/2016 | Sloop | H01M 10/54 |
| 9,773,620 B2* | 9/2017 | Azais | H01G 11/04 |
| 2009/0214933 A1* | 8/2009 | Sloop | H01M 10/052 |
| | | | 429/49 |
| 2010/0146761 A1* | 6/2010 | Sloop | H01M 6/52 |
| | | | 29/403.3 |
| 2010/0203366 A1* | 8/2010 | Sloop | H01M 4/485 |
| | | | 429/49 |
| 2014/0377597 A1* | 12/2014 | Sloop | H01M 10/052 |
| | | | 429/49 |
| 2016/0071658 A1* | 3/2016 | Azais | H01G 11/04 |
| | | | 361/502 |

FOREIGN PATENT DOCUMENTS

| | | | | |
|---|---|---|---|---|
| CN | 102544629 A | 7/2012 | | |
| CN | 103219562 A | 7/2013 | | |
| DE | 10 2011 109 137 A1 | 2/2013 | | |
| WO | WO 2008022414 A1 * | 2/2008 | ............ | C22B 7/006 |
| WO | WO 2008022415 A1 * | 2/2008 | ............ | H01M 6/52 |
| WO | 2009/105713 A1 | 8/2009 | | |

OTHER PUBLICATIONS

Xu, J., et al., "A Review of Processes and Technologies for the Recycling of Lithium-Ion Secondary Batteries," Journal of Power Sources 177:512-527, Jan. 14, 2008.

International Search Report dated Feb. 3, 2015, issued in corresponding International Application No. PCT/IB2014/065267, filed Oct. 13, 2014, 3 pages.

Written Opinion of the International Searching Authority dated Feb. 3, 2015, issued in corresponding International Application No. PCT/IB2014/065267, filed Oct. 13, 2014, 5 pages.

\* cited by examiner

```
┌─────────────────────────────────────┐
│ USING NEGATIVE ELECTRODE B AS A NEGATIVE │
│ ELECTRODE A OF HYBRID SUPERCAPACITOR BASED │
│ ON AN ALKALI METAL, WHEREIN ELECTRODE B IS │     1000
│ MADE OF GRAPHITE, WHEREIN THE GRAPHITE IS │
│ PARTICULATE GRAPHITE, AND WHEREIN THE │
│ PARTICULATE GRAPHITE HAS A STATISTICAL MEAN │
│ PARTICLE DIAMETER D50 OF BETWEEN 0.1 AND │
│ 50 MM, LIMITS INCLUDED │
└─────────────────────────────────────┘
```

FIG. 10

```
┌─────────────────────────────────────┐
│ USING NEGATIVE ELECTRODE B AS A NEGATIVE │     1100
│ ELECTRODE A OF HYBRID SUPERCAPACITOR BASED │
│ ON AN ALKALI METAL │
└─────────────────────────────────────┘
                    │
                    ▼
┌─────────────────────────────────────┐
│ WHEREIN THE ALKALI METAL-ION BATTERY HAS │
│ AN ELECTROLYTE WITH A SOLVENT, AND REMOVAL │
│ OF ALKALI METAL SALTS FROM ELECTRODE B │     1102
│ INCLUDES RINSING ELECTRODE B WITH A SOLVENT │
│ SIMILAR TO THE SOLVENT OF THE ELECTROLYTE │
│ USED IN THE ALKALI METAL-ION BATTERY │
└─────────────────────────────────────┘
```

FIG. 11

```
┌─────────────────────────────────────┐
│ USING NEGATIVE ELECTRODE B AS A NEGATIVE │     1200
│ ELECTRODE A OF HYBRID SUPERCAPACITOR BASED │
│ ON AN ALKALI METAL │
└─────────────────────────────────────┘
                    │
                    ▼
┌─────────────────────────────────────┐
│ REMOVAL OF ALKALI METAL IN THE METAL FORM │
│ FROM ELECTRODE B INCLUDES PASSING │     1202
│ ELECTRODE B THROUGH A BATH OF ACETONITRILE │
│ OR ETHANOL │
└─────────────────────────────────────┘
```

FIG. 12

PROCESS FOR MANUFACTURING AN ALKALINE-BASED HYBRID SUPERCAPACITOR TYPE BATTERY, BATTERY OBTAINED BY THIS PROCESS AND PROCESS FOR RECYCLING AN ANODE MATERIAL OF AN ALKALI-ION BATTERY

The invention relates to a process for the manufacture of an alkaline-based hybrid supercapacitor battery, to an alkaline-based battery and to a process for recycling a negative electrode of an alkalin-metal-ion battery.

A hybrid supercapacitor comprises a pair of asymmetric electrodes, that is to say a positive electrode (cathode) comprising activated carbon and operating on the principle of a supercapacitor (which is the site of the formation of an electric double layer) and a negative electrode (anode) comprising a carbon-based material and operating on the principle of a battery (electrode material capable of intercalating an alkali-metal element, such as lithium, potassium or sodium).

When the reaction at the negative electrode involves lithium as intercalating element, the term used is then LIC (Lithium-Ion-Capacitor).

In a LIC, the positive electrode (electrode of the supercapacity type) limits the storage capacity of the system. For this reason, use is made of a much smaller portion of the maximum capacity of the negative electrode material (typically 372 mAh/g for graphite).

Furthermore, alkali metal-ion batteries, which are electrochemical storage systems composed of a cathode, of an electrolyte, of a separator and of an anode (generally made of "hard" carbon or graphite), are known.

This type of battery uses, as alkali metal, lithium, sodium or potassium.

Li-ion batteries are used in particular. These are electrochemical storage systems in which the cathode can be $LiFePO_4$, $LiMn_2O_4$, $LiCoO_2$ or any other lithiated oxide or phosphate and the electrolyte is a lithium-based electrolyte.

The typical composition of a Li-ion battery is given in particular in Xu et al., Journal of Power Sources, 177 (2008), 512-527.

This composition is given in the following table 1:

TABLE 1

Typical composition of a Li-ion battery

| Constituent | Weight (%) |
|---|---|
| $LiCoO_2$ | 27.5 |
| Steel/Ni | 24.5 |
| Cu/Al | 14.5 |
| Carbon | 16 |
| Electrolyte | 3.5 |
| Polymer | 14 |

The performance of this type of battery in terms of energy density has allowed them to become established in numerous markets, such as those of portable computers or telephones. From now on, an ever-greater world demand is presenting the problem of the recycling of Li-ion batteries. This problem arises first for reasons of safety (presence of flammable products and of toxic elements in these batteries) but also for economic reasons (recycling of the lithium and also of the heavy metals described in table 1). All the economic studies carried out to date as listed in "Cost and Performance of EV batteries, Final Report for the Committee on Climate Change, 21 Mar. 2012, Element Energy Ltd.; The market for Lithium Secondary Batteries (containing Mn) and Future Developments, Mitsubishi Corporation Unimetal, Battery Raw Materials Team; Roland Berger, The Li Ion Battery Value Chain, 2011", clearly show that the materials of greatest recoverable value are the cathode and the electrolyte. For this reason, all efforts are currently concentrated on the recovery in value of the cathode, the anode being relatively inexpensive and of little recoverable value.

To date, two strategies have been provided for the recycling of the materials of a Li-ion battery.

The first strategy is targeted at recovering the most expensive elements of the device, namely the heavy metals present in the cathode (cobalt, nickel, and the like), as well as the lithium. Chemical and/or physical treatments are used in order to recover these elements. These treatments generally involve the dissolution of the anode and cathode materials and then the selective precipitation of the elements to be recovered, in particular, as described in Suzukia et al., Separation and Purification Technology, 98 (2012), 396-401, by hydrometallurgy techniques making possible a better selectivity.

Several patents or patent applications provide methods making possible the recovery of heavy metals (see, for example, patent applications CN101692510 and CN102569940) or lithium, as described in the international applications WO201335048 and WO201335048.

The second strategy for its part is targeted at the reuse or the regeneration of the constituent materials of the Li-ion battery. For example, patent application US20100068605A1 describes a device which makes possible the replacement of the electrolyte of a Li-ion battery without dismantling the latter, in order to subsequently reuse it. In point of fact, according to the literature, it is well known that the materials of electrodes of a Li-ion battery degrade during the phase of use [Agubra et al., Materials, 6 (2013), 1310-1325]. Thus, international application WO2011155298 provides a process for the estimation of the progress of degradation of the electrodes of a Li-ion battery. At the negative electrode (graphite carbon) in particular, it has been shown that, after a phase of use, phenomena such as changes in phases may take place, the consequence of which is a decrease in the capacity of the negative electrode material. For this reason, the reuse of the anode material in system of Li-ion or alkali metal-ion type, generally, without the regeneration of this material, may have the consequence of a deterioration in the performance of the device.

In contrast to the teachings of the prior art, the aim of the invention is, on the one hand, to recycle the anode material of a battery of the alkali metal-ion type and, on the other hand, to provide a process for the manufacture of a battery of the hybrid supercapacitor type which is simple to carry out and inexpensive.

To this end, the invention provides a process for the manufacture of an alkaline-based hybrid supercapacitor battery, characterized in that it comprises a step a) of formation of a negative electrode A from an electrode B material originating from a used alkali metal-ion battery which has lost at least a portion of its initial capacity.

According to an advantageous characteristic, the process of the invention does not comprise a step of formation of a passivation layer on the surface of the negative electrode A.

Preferably, the electrode B material is graphite. Particulate graphite is preferred, more particularly particulate graphite for which the statistical mean diameter $D_{50}$ of the particles is between 0.1 and 50 μm, limits included.

The process of the invention can comprise, before step a), a step b) of removal of the alkali metal salts from the material of the electrode B, preferably by rinsing with a solvent similar to the solvent of the electrolyte initially present in the used battery (for example, a mixture of EC/DMC carbonates in the case of a Li-ion battery).

The process of the invention can additionally comprise, before step a), a step c) of removal of the alkali metal in the metal form from the electrode B material. This removal is preferably carried out by continuously passing the electrode B material through a bath of acetonitrile or ethanol.

Preferably, the electrode A consists of the electrode B.

The alkali metal can be chosen from Li, K or Na. Preferably, the alkali metal is Li.

The invention also provides an alkaline-based (also called alkali metal) hybrid supercapacitor battery comprising a negative electrode A made of an electrode B material recycled from a used alkali metal-ion battery which has lost at least a portion of its initial capacity.

The electrode B material can be graphite, preferably particulate graphite, preferably having a statistical mean particle diameter $D_{50}$ of between 0.1 and 50 μm, limits included.

The alkali metal of the battery of the invention is chosen from Li, K or Na. It is preferably Li.

Preferably, the electrode A is the electrode B.

The invention also provides a process for the recycling of a negative electrode B of a used alkali metal-ion battery which has lost at least a portion of its initial capacity, comprising a step of manufacture of a negative electrode A of a battery of the type of a hybrid supercapacitor based on an alkali metal from the negative electrode B material according to the invention.

In this recycling process, preferably, the electrode B material is graphite, more preferably particulate graphite, in particular for which the statistical mean diameter $D_{50}$ of the particles is between 0.1 and 50 μm, limits included.

A better understanding of the invention will be obtained and other advantages and characteristics of the invention will become more clearly apparent on reading the explanatory description which follows and which is made with reference to the figures, in which:

FIG. 10 is a flowsheet of a process for the recycling of a negative electrode B of a used alkali metal-ion battery which has lost at least a portion of initial capacity comprising step 1000;

FIG. 11 is a flowsheet of a process for the manufacture of a hybrid supercapacitor based on alkali metal and which has a negative electrode A, comprising steps 1100, 1102;

FIG. 12 is a flowsheet of a process for the manufacture of a hybrid supercapacitor based on alkali metal and which has a negative electrode A, comprising steps 1200, 1202.

Figure 1:
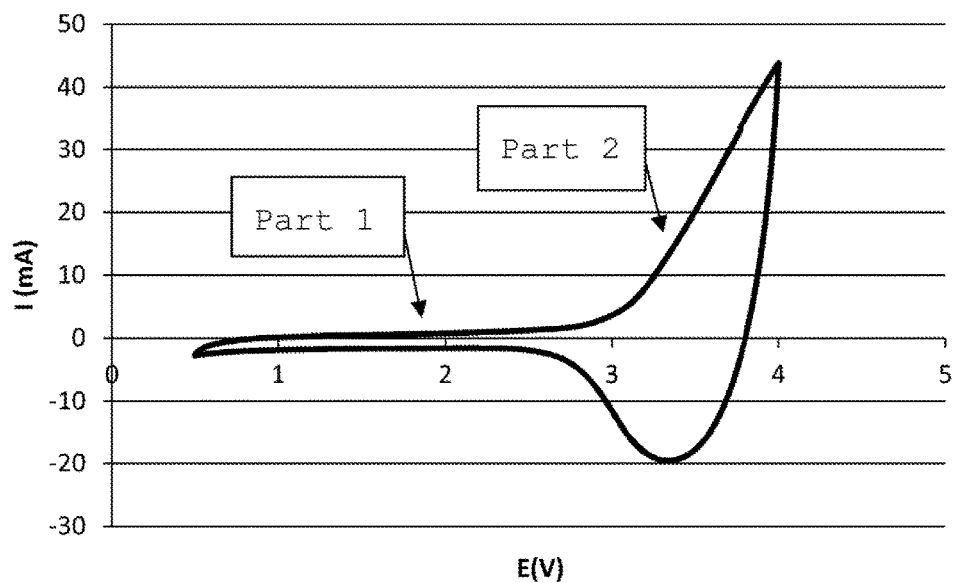
FIG. 1 represents the voltammogram of a hybrid system of LIC type of the prior art.

The invention is based on the reuse (recycling) of the electrode material of an anode originating from a preused battery of the alkali metal-ion type, without regeneration of this anode material.

Thus, the invention provides a process for the manufacture of a battery of hybrid supercapacitor type which comprises a step a) of formation of a negative electrode, denoted A in the present text, from the anode, denoted B in the present text, material of a battery of alkali metal-ion type originating from a preused battery of alkali metal-ion type which has lost at least a portion of its initial capacity.

"Preused" or "used" or "which has lost at least a portion of its initial capacity" is understood to mean that the anode B material has already been employed within an electrode B forming part of an alkali metal-ion battery. Preferably, it is understood that the alkali metal-ion battery from which the material B results has already operated for at least 10 cycles; preferably, the anode B material has lost at least 5% of its initial capacity, more preferably at least 10% and more preferably still at least 20%.

The term "formation of a negative electrode A" means, in the invention, as well a step of manufacture (bringing to the required size, for example) of this electrode A in the material of the electrode B as the use as is, that is to say without bringing to a different shape or size, of the electrode B.

Nevertheless, preferably, the material B is reused directly in its form of electrode B, that is to say without prior isolation of the material B, in order to retain the benefit on the formation of the SEI layer (passivation layer) on the electrode B during its use in the alkali metal-ion battery.

Electrode is understood conventionally to mean a current collector (strip made of aluminum, copper, stainless steel) on which is coated a mixture of binder (typically a polymer or blend of polymers, such as PVDF, carboxymethyl cellulose or styrene/butadiene), of material B and optionally of additional electron conductor material (typically carbon fiber of VGCF (vapor growth carbon fiber) type).

In addition, in the invention, the electrode B can originate from any type of alkali metal-ion battery.

The lifetime of a battery of alkali metal-ion type is generally defined by the residual capacity of the component. The value commonly accepted is to set the end of life at 80% of the initial capacity.

Thus, the invention provides for the use of the material of an electrode which has lost a portion of its capacity when employed in an alkali metal-ion battery but which still has a capacity suitable for use in a battery of hybrid supercapacitor type.

This material is the negative electrode material of the battery of the alkali metal-ion type.

In the invention, this material is used to manufacture a negative electrode of a battery of the supercapacitor type. The recycled negative electrode material of the alkali metal-ion battery exhibits the advantage of being able to be used without regeneration and, furthermore, without obligatory formation of what is known as the passivation layer.

This is because, for the alkali metal-ion battery technology or the technology of the type of a hybrid supercapacitor based on an alkali metal, in order to be able to retain a correct lifetime, a passivation layer is formed at the surface of the negative electrode during the first cycles. In point of fact, this passivation layer involves a major consumption of electrolyte during its formation.

However, in the invention, the fact of recycling an electrode resulting from a battery of alkali metal-ion type implies that the passivation layer is already present and thus makes it possible to eliminate the cost of formation of the latter.

The negative electrode material is, in the invention, a carbon-based material with intercalation of at least one alkali metal element, such as lithium, sodium or potassium.

A preferred material in the invention is a carbon-based material of the graphite type, more specifically a carbon-based material of the particulate graphite type, more preferably for which the size of the particles can range from 0.1 to 50 μm, this particle size being measured by $D_{50}$ laser granulometry.

In the battery of the invention, which comprises this negative electrode, the electrolyte comprises a salt of an alkali metal chosen from sodium salts, potassium salts or lithium salts, according to the type of alkali metal of the battery, and one or more organic solvents for this salt.

For their part, the organic solvent or solvents can be nitrile solvents, lactones, ethers, sulfides or carbonate solvents and any other combination of the above solvents.

The process for the manufacture of a battery of the alkali metal-ion supercapacitor type can additionally comprise a step of removal of the alkali metal (lithium, sodium, potassium) salts from the electrode B material originating from the used alkali metal-ion battery, these salts being deposited on this electrode B material during its preceding use in the alkali metal-ion battery.

This removal can be carried out by rinsing the electrode B material with a similar solvent to that initially present in the electrolyte of the used battery (for example a mixture of EC/DMC (ethyl carbonate/dimethyl carbonate) carbonates in the case of a Li-ion battery).

"Similar solvent" is understood to mean a solvent, the formula of which comprises at least one carbonate group. Thus, the rinsing solvent is preferably chosen from ethylene carbonate, ethyl methyl carbonate, propylene carbonate, dimethyl carbonate, diethyl carbonate, vinyl ethylene carbonate, the mixtures of two or more of these carbonates or also the mixtures of one or more of these carbonates with butyrolactone.

The process for the manufacture of a battery of the alkali metal-ion supercapacitor type of the invention can additionally comprise, before step a) of formation of a negative electrode A from the electrode B material originating from the used alkali metal-ion battery, a step of removal of the alkali metal in the metal form which is formed in the preceding use of the alkali metal-ion battery from which the electrode B material originates.

This removal can be carried out by continuously passing the electrode B material through a bath (copious rinsing until the alkali metal precipitated at the electrode surface has completely dissolved) of acetonitrile or of ethanol.

The invention also provides a battery of the type of a hybrid supercapacitor based on an alkali metal which comprises a negative electrode A formed of a recycled electrode B material originating from a used alkali metal-ion battery which has lost a portion of its initial capacity.

Preused or used or which has lost at least a portion of its initial capacity is understood to mean that the anode B material has already been employed within an electrode B forming part of an alkali metal-ion battery. Preferably, it is understood that the alkali metal-ion battery from which the material B results has already operated for at least 10 cycles, has preferably lost at least 5% of its initial capacity, more preferably at least 10% and more preferably still at least 20%.

This negative electrode A is preferably made of graphite, more particularly of particulate graphite, more preferably having a mean diameter $D_{50}$ of between 0.1 and 50 μm, limits included.

The invention also provides a process for the recycling of a negative electrode B originating from a used alkali metal-ion battery which has lost at least a portion of its initial capacity, which comprises a step of manufacture of a battery of the type of a hybrid supercapacitor based on an alkali metal comprising a negative electrode A made of the negative electrode B material.

Preferably, the negative electrode A is or corresponds to the negative electrode B. In other words, the B material is not isolated but is reused directly formulated as electrode without separation of the constituents of the electrode, which are the B material, the polymer binder and optionally the additional electron conductor.

In order to achieve a better understanding of the invention, an embodiment thereof will now be described as purely illustrative and nonlimiting example.

EXAMPLE 1

Preparation of a Device of LIC Type of the Prior Art

This example describes the preparation of a device of LIC type from a pair of (negative and positive) electrodes which have not been used in a battery of Li-ion type beforehand. This device is subsequently characterized by cyclic voltammetry.

a) Preparation of a Device of LIC Type

The positive electrode of the LIC device is prepared by coating, on a collector made of aluminum with a thickness of 30 μm, comprising, in percentage by weight with respect to the total weight of the electrode:

84% of activated carbon having the YP50F reference (Kuraray Chemicals Co., Japan)
4% of a styrene/butadiene rubber (BASF, LD471)
8% of carbon black having the Super C65 reference (Timcal Co., Switzerland)
4% of carboxymethyl cellulose (Aldrich).

The negative electrode is prepared by coating, on a collector made of aluminum with a thickness of 30 μm, a mixture comprising, in percentage by weight with respect to the total weight of the electrode:

94% of graphite carbon having the SLP 30 reference (Timcal)
2% of VGCF (Vapor Grown Carbon Fiber) conducting carbon
2% of 2% CMC (7HXF, Aqualon)
2% of Styrofan (51% LD417, BASF).

The positive and negative electrodes with a surface area equal to 10.24 cm$^2$ (3.2*3.2 cm) are assembled in a cell of pouch cell type. The electrolyte used is a carbonate mixture (ethyl carbonate/dimethyl carbonate: EC/DMC 1/1 vol./vol.) containing a lithium salt (1M LiPF$_6$) and is used in an amount sufficient to impregnate the whole of the pouch cell. The separator used is a separator made of polymer PDA 25® sold by Treofan GmbH, Germany, with a thickness of 25 μm.

b) Characterization of the Device by Cyclic Voltammetry

The hybrid device of LIC type described in part a) above is tested by cyclic voltammetry. Three successive scans between 0.5 and 4 V are carried out at a rate of 10 mV/s.

The voltammogram obtained is represented in FIG. 1.

As is seen in FIG. 1, the hybrid system obtained in example 1 has the expected behavior, that is to say that a first part of the voltammogram, denoted part 1 in FIG. 1, between 0.5 and 2.5 V, corresponds to the supercapacitor part of the system and a second part, denoted part 2 in FIG. 1, between 2.5 and 4 V, corresponds to the part where lithium is inserted into the battery-type electrode of the device.

EXAMPLE 2

Preparation of a Device of LIC Type by the Process of the Invention

This example again takes up the experiment of example 1 but this time the negative electrode used in the device of LIC type results from a used battery of Li-ion type.

a) Preparation of a Battery of Li-Ion Type

This battery is composed of a positive electrode made of $LiFePO_4$ and of a negative electrode prepared as described in example 1. The positive and negative electrodes, having one and the same surface area equal to 10.24 cm² (3.2*3.2 cm), are assembled in a cell of pouch cell type. The electrolyte used is a carbonate mixture (EC/DMC 1.1) containing a lithium salt (1M $LiPF_6$) which is used in an amount sufficient to impregnate the whole of the pouch cell. The passivation layer is formed in the first charge/discharge cycle and then the battery is used for approximately 10 cycles under conditions of charge and discharge cycles at a charge (1C) or discharge (1D) current corresponding to the limiting capacity of the battery of Li-ion type, with 1C and 1D CCCV constant current charge in a first step, until a potential close to the charge potential is reached, before finishing the constant potential charge, for 15 minutes.

Subsequently, the battery is disassembled under an inert atmosphere in a glove box and the negative electrode is rinsed for 10 minutes in a carbonate mixture (EC/DMC 1/1 vol./vol.) in order to remove the remaining lithium salt. Advantageously, the electrode can be passed through a continuous bath of acetonitrile or of ethanol in order to remove the lithium potentially present in the metal form (case which may be present in the case of extreme aging of a Li-ion battery).

b) Preparation of a Battery of LIC Type According to the Invention, Equipped with the Negative Electrode Resulting from the Battery The negative electrode described above and resulting from the Li-ion battery is used as is in a battery of LIC type with a positive electrode prepared in the same way as described in part a) above.

The positive and negative electrodes, with a surface area equal to 10.24 cm² (3.2*3.2 cm), are assembled in a cell of pouch cell type. The electrolyte used is a carbonate mixture (EC/DMC 1/1 vol./vol.) containing a lithium salt (1M $LiPF_6$) and is used in an amount sufficient to impregnate the whole of the pouch cell. The separator used is PDA 25 (Treofan GmbH, Germany), with a thickness of 25 µm.

c) Characterization of the Battery According to the Invention by Cyclic Voltammetry The same protocol as that set out in part 1) b) above is applied to the battery of LIC type obtained in this example.

Figure 2:
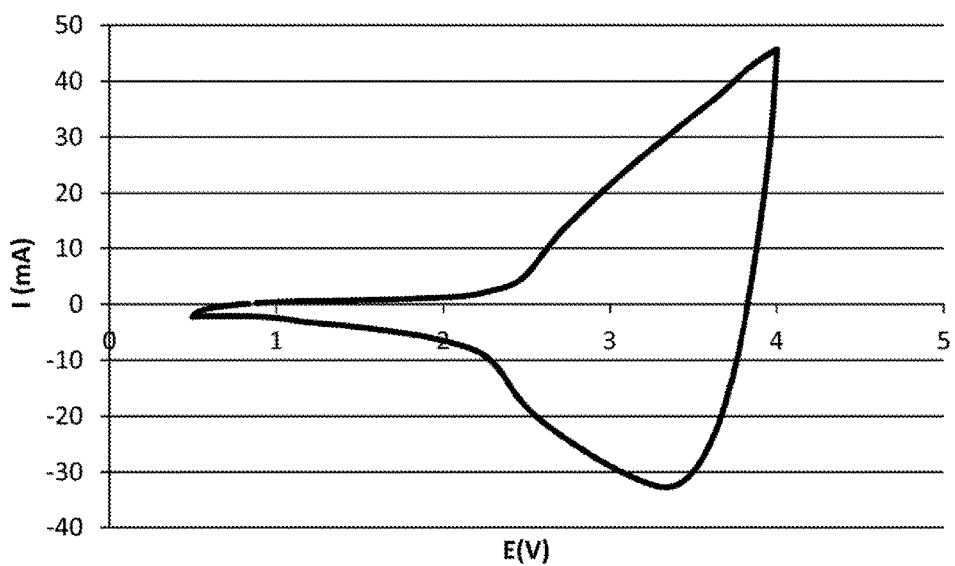
FIG. 2 represents the voltammogram of a hybrid system of the LIC type according to the invention.
Figure 3:
FIG. 3 is a flowsheet of a process for the manufacture of a hybrid supercapacitor based on alkali metal and which has a negative electrode A, comprising step 300.
Figure 4:
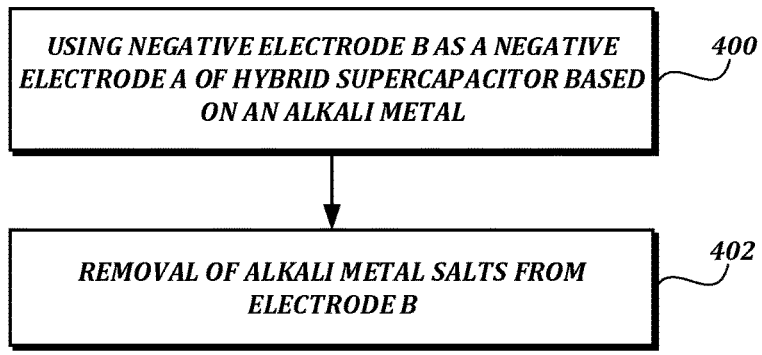
FIG. 4 is a flowsheet of a process for the manufacture of a hybrid supercapacitor based on alkali metal and which has a negative electrode A, comprising steps 400, 402.
Figure 5:
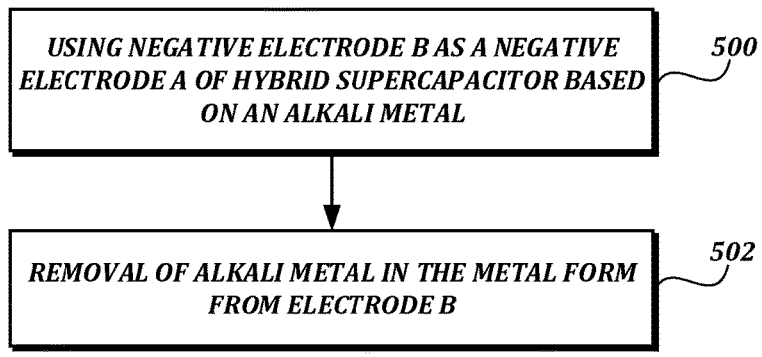
FIG. 5 is a flowsheet of a process for the manufacture of a hybrid supercapacitor based on alkali metal and which has a negative electrode A, comprising steps 500, 502.
Figure 6:
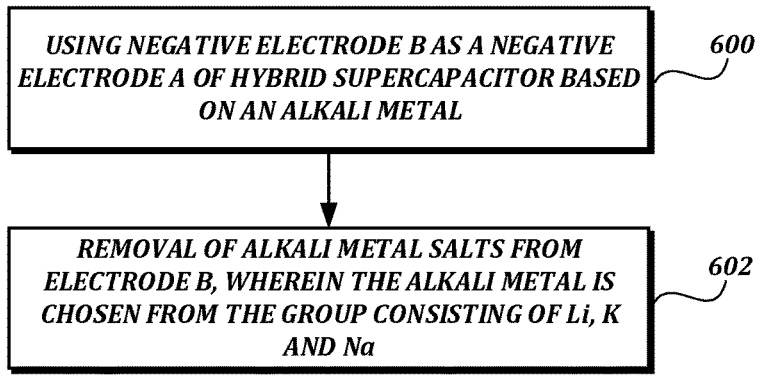
FIG. 6 is a flowsheet of a process for the manufacture of a hybrid supercapacitor based on alkali metal and which has a negative electrode A, comprising steps 600, 602.
Figure 7:
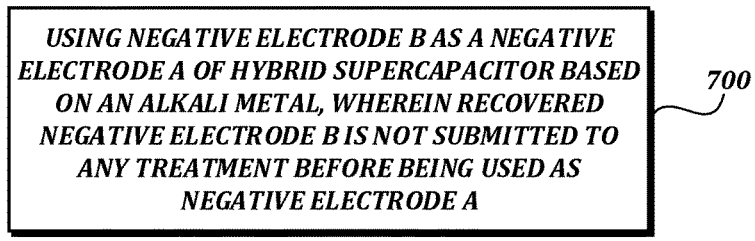
FIG. 7 is a flowsheet of a process for the manufacture of a hybrid supercapacitor based on alkali metal and which has a negative electrode A, comprising step 700.
Figure 8:
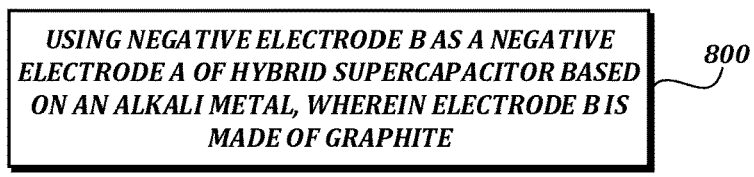
FIG. 8 is a flowsheet of a process for the manufacture of a hybrid supercapacitor based on alkali metal and which has a negative electrode A, comprising step 800.
Figure 9:
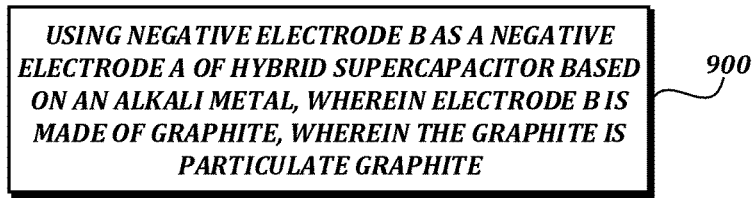
FIG. 9 is a flowsheet of a process for recycling a negative electrode B of a used alkali metal-ion battery which has lost at least a portion of initial capacity comprising step 900.

The voltammogram obtained is represented in FIG. 2.

It is seen, in FIG. 2, that the voltammogram obtained with the battery of LIC type of the invention has an electrochemical behavior similar to that represented in FIG. 1, that is to say to the battery of LIC type of the prior art.

This is because this voltammogram exhibits two distinct parts: one, from 0.5 to 2 V, hallmarking the supercapacitor aspect and the other, from 2 to 4 V, specific to the battery aspect of the device.

Moreover, from the examination of the area under the voltammogram representing the capacity of the system studied, it is noted that the capacity is greater in the case of a battery of LIC type using a negative electrode resulting from a battery of Li-ion type (FIG. 2) than for a battery of LIC type using an unused negative electrode. This can be related to the conditions of formation of the passivation layer.

Example 2 shows the possibility of using a negative electrode material resulting from a device of Li-ion type in a device of LIC type without this affecting its performance.

This example also shows that it is possible to recycle negative electrodes from a used device of Li-ion type without treatment of this material.

Although the examples which precede all relate to Li-ion batteries, it is clearly apparent to a person skilled in the art that use may be made of any preused electrode material from an alkali metal-ion battery, such as a K-ion battery or a Na-ion battery, in a battery of supercapacitor type operating with the desired alkali metal ion.

Thus, the present invention can be applied to any alkali metal-ion device, such as K-ion batteries or else Na-ion batteries.

The invention claimed is:

1. A process for recycling a negative electrode B of a used alkali metal-ion battery which has lost at least a portion of initial capacity, comprising using negative electrode B as a negative electrode A of a hybrid supercapacitor based on an alkali metal.

2. The recycling process as claimed in claim 1, wherein electrode B is made of graphite.

3. The process as claimed in claim 2, wherein the graphite is particulate graphite.

4. The process as claimed in claim 3, wherein the particulate graphite has a statistical mean particle diameter $D_{50}$ of between 0.1 and 50 µm, limits included.

5. The process as claimed in claim 1, comprising a step of removal of alkali metal salts from electrode B.

6. The process as claimed in claim 1, comprising a step of removal of alkali metal in the metal form from electrode B.

7. The process as claimed in claim 5, wherein the alkali metal is chosen from the group consisting of Li, K and Na.

8. The process as claimed in claim 1, wherein recovered negative electrode B is not submitted to any treatment before being used as negative electrode A.

9. The process as claimed in claim 5, wherein the alkali metal-ion battery has an electrolyte with a solvent, and wherein the step of removal of the alkali metal salts from electrode B includes rinsing electrode B with a solvent similar to the solvent of the electrolyte used in the alkali metal-ion battery.

10. The process as claimed in claim 6, wherein the step of removal of the alkali metal in the metal form from electrode B includes passing electrode B through a bath of acetonitrile or ethanol.

* * * * *